United States Patent
Yokoi

(10) Patent No.: US 9,500,845 B2
(45) Date of Patent: Nov. 22, 2016

(54) NONLINEAR OPTICAL MICROSCOPE APPARATUS

(71) Applicant: OLYMPUS CORPORATION, Shibuya-ku, Tokyo (JP)

(72) Inventor: Eiji Yokoi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 205 days.

(21) Appl. No.: 14/288,145

(22) Filed: May 27, 2014

(65) Prior Publication Data

US 2014/0362435 A1  Dec. 11, 2014

(30) Foreign Application Priority Data

Jun. 5, 2013 (JP) ................................. 2013-118936

(51) Int. Cl.
*G02B 21/06* (2006.01)
*G02B 21/00* (2006.01)
*G02B 21/16* (2006.01)

(52) U.S. Cl.
CPC ....... *G02B 21/0032* (2013.01); *G02B 21/0076* (2013.01); *G02B 21/16* (2013.01); *G02B 21/06* (2013.01); *G02B 2207/114* (2013.01)

(58) Field of Classification Search
None
See application file for complete search history.

(56) References Cited

U.S. PATENT DOCUMENTS

| 2007/0081241 | A1 | 4/2007 | Hayashi |
| 2007/0229946 | A1 | 10/2007 | Okada et al. |
| 2011/0226962 | A1* | 9/2011 | Boudreau ............ G01N 21/645 |
| | | | 250/459.1 |

FOREIGN PATENT DOCUMENTS

| JP | 2006-292782 A | 10/2006 |
| JP | 2007-263730 A | 10/2007 |
| JP | 2010-096813 A | 4/2010 |
| JP | 4759425 B2 | 8/2011 |

* cited by examiner

*Primary Examiner* — Derek S Chapel
(74) *Attorney, Agent, or Firm* — Holtz, Holtz & Volek PC

(57) ABSTRACT

A nonlinear optical microscope apparatus includes: an objective for irradiating a laser beam on a sample; a beam diameter change unit for changing a beam diameter of the laser beam incident to the objective; and a control unit for deciding, for each of optical characteristics of the sample, a pupil filling ratio, which is a ratio of the beam diameter of the laser beam incident to the objective to a pupil diameter of the objective, based on the optical characteristics of the sample, and for controlling the beam diameter change unit so that the pupil filling ratio becomes the decided value.

12 Claims, 18 Drawing Sheets

F I G. 3

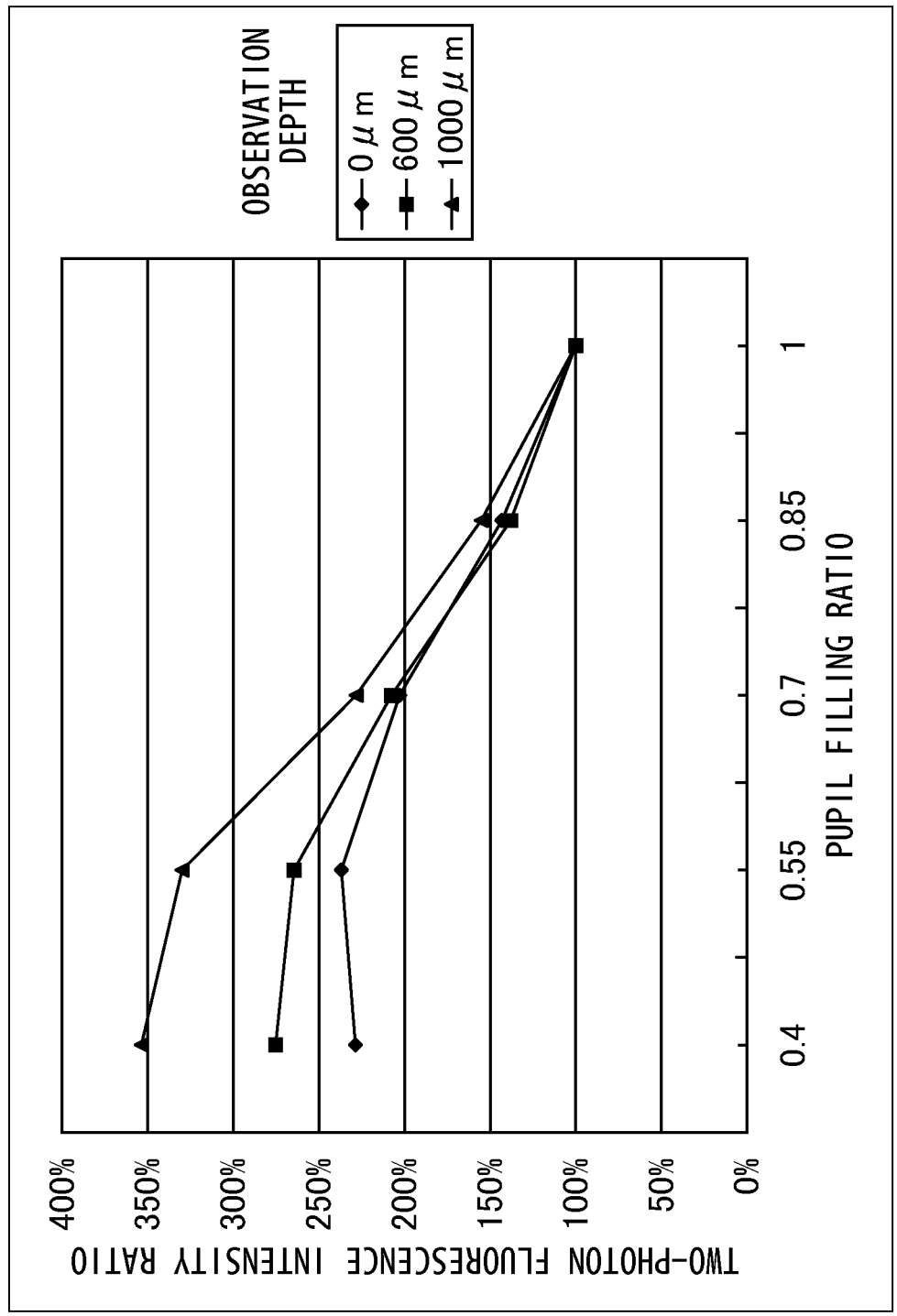
F I G. 4

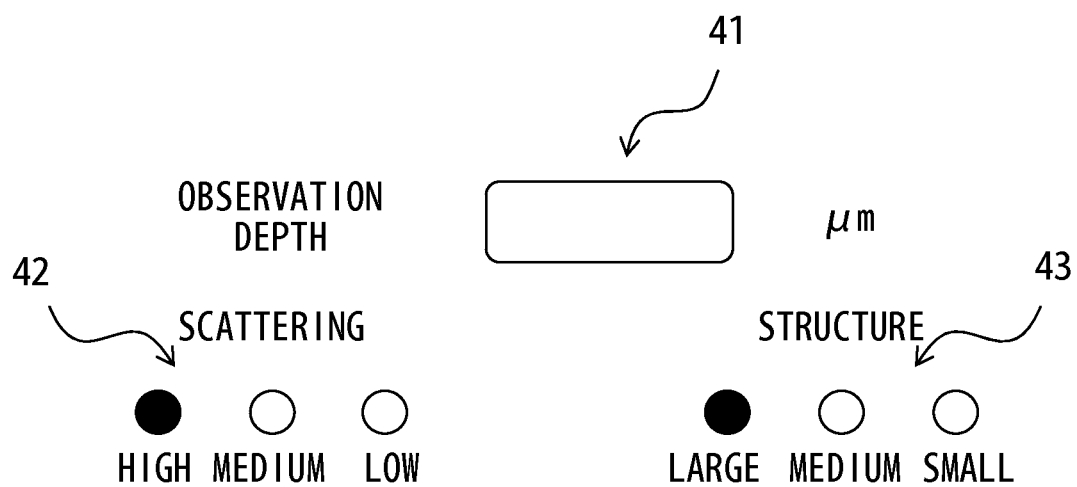
F I G. 8

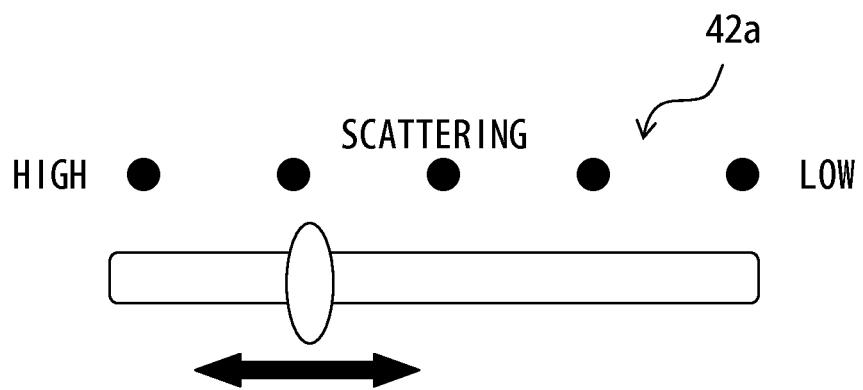
F I G. 9A

| EXCITATION WAVELENGTH | 900nm | | | | | | | | |
|---|---|---|---|---|---|---|---|---|---|
| | SCATTERING "LOW" | | | SCATTERING "MEDIUM" | | | SCATTERING "HIGH" | | |
| | SIZE OF ILLUMINANT | | | SIZE OF ILLUMINANT | | | SIZE OF ILLUMINANT | | |
| OBSERVATION DEPTH | LARGE | MEDIUM | SMALL | LARGE | MEDIUM | SMALL | LARGE | MEDIUM | SMALL |
| 0 | 0.6 | 0.8 | 1.0 | 0.6 | 0.8 | 1 | 0.6 | 0.8 | 1.0 |
| 100 | 0.6 | 0.8 | 1.0 | 0.6 | 0.8 | 1 | 0.6 | 0.8 | 1.0 |
| 200 | 0.6 | 0.8 | 1.0 | 0.55 | 0.75 | 0.95 | 0.5 | 0.7 | 0.9 |
| 300 | 0.6 | 0.8 | 1.0 | 0.55 | 0.75 | 0.95 | 0.5 | 0.7 | 0.9 |
| 400 | 0.6 | 0.8 | 0.9 | 0.55 | 0.75 | 0.95 | 0.5 | 0.7 | 0.9 |
| 500 | 0.5 | 0.7 | 0.9 | 0.45 | 0.65 | 0.85 | 0.4 | 0.6 | 0.8 |
| 600 | 0.5 | 0.7 | 0.9 | 0.45 | 0.65 | 0.85 | 0.4 | 0.6 | 0.8 |
| 700 | 0.5 | 0.7 | 0.9 | 0.45 | 0.65 | 0.85 | 0.4 | 0.6 | 0.8 |
| 800 | 0.5 | 0.7 | 0.9 | 0.4 | 0.6 | 0.8 | 0.35 | 0.5 | 0.7 |
| 900 | 0.5 | 0.7 | 0.9 | 0.4 | 0.6 | 0.8 | 0.35 | 0.5 | 0.7 |
| 1000 | 0.5 | 0.7 | 0.9 | 0.4 | 0.6 | 0.8 | 0.35 | 0.5 | 0.7 |
| 1100 | 0.5 | 0.7 | 0.9 | 0.4 | 0.6 | 0.75 | 0.3 | 0.45 | 0.6 |
| 1200 | 0.5 | 0.7 | 0.9 | 0.4 | 0.6 | 0.75 | 0.3 | 0.45 | 0.6 |

| EXCITATION WAVELENGTH | 1000nm | | | | | | | | |
|---|---|---|---|---|---|---|---|---|---|
| | SCATTERING "LOW" | | | SCATTERING "MEDIUM" | | | SCATTERING "HIGH" | | |
| | SIZE OF ILLUMINANT | | | SIZE OF ILLUMINANT | | | SIZE OF ILLUMINANT | | |
| OBSERVATION DEPTH | LARGE | MEDIUM | SMALL | LARGE | MEDIUM | SMALL | LARGE | MEDIUM | SMALL |
| 0 | 0.6 | 0.8 | 1.0 | 0.6 | 0.8 | 1 | 0.6 | 0.8 | 1.0 |
| 200 | 0.6 | 0.8 | 1.0 | 0.6 | 0.8 | 1 | 0.6 | 0.8 | 1.0 |
| 400 | 0.6 | 0.8 | 1.0 | 0.55 | 0.75 | 0.95 | 0.5 | 0.7 | 0.9 |
| 600 | 0.6 | 0.8 | 1.0 | 0.55 | 0.75 | 0.95 | 0.5 | 0.7 | 0.9 |
| 800 | 0.6 | 0.8 | 0.9 | 0.55 | 0.75 | 0.95 | 0.5 | 0.7 | 0.9 |
| 1000 | 0.5 | 0.7 | 0.9 | 0.45 | 0.65 | 0.85 | 0.4 | 0.6 | 0.8 |
| 1200 | 0.5 | 0.7 | 0.9 | 0.45 | 0.65 | 0.85 | 0.4 | 0.6 | 0.8 |
| 1400 | 0.5 | 0.7 | 0.9 | 0.45 | 0.65 | 0.85 | 0.4 | 0.6 | 0.8 |
| 1600 | 0.5 | 0.7 | 0.9 | 0.4 | 0.6 | 0.8 | 0.35 | 0.5 | 0.7 |
| 1800 | 0.5 | 0.7 | 0.9 | 0.4 | 0.6 | 0.8 | 0.35 | 0.5 | 0.7 |
| 2000 | 0.5 | 0.7 | 0.9 | 0.4 | 0.6 | 0.8 | 0.35 | 0.5 | 0.7 |
| 2200 | 0.5 | 0.7 | 0.9 | 0.4 | 0.6 | 0.75 | 0.3 | 0.45 | 0.6 |
| 2400 | 0.5 | 0.7 | 0.9 | 0.4 | 0.6 | 0.75 | 0.3 | 0.45 | 0.6 |

| USER SETTINGS OF SAMPLE S | | | WAVELENGTH | OPTIMUM EFFECTIVE NA | TYPE OF OBJECTIVE LENS (NA) | SLIDER POSITION | SETTING EFFECTIVE NA | PUPIL FILLING RATIO (%) |
|---|---|---|---|---|---|---|---|---|
| DEPTH | SCATTERING | SIZE OF SAMPLE | | | | | | |
| 0 | HIGH | SMALL | 900 | 1 | 1 | 100 | 1 | 1 |
| 200 | HIGH | SMALL | 900 | 0.9 | 1 | 80 | 0.8 | 0.8 |
| 400 | HIGH | SMALL | 900 | 0.9 | 1 | 80 | 0.8 | 0.8 |
| 600 | HIGH | LARGE | 900 | 0.4 | 1 | 40 | 0.4 | 0.4 |
| 700 | HIGH | LARGE | 900 | 0.4 | 1 | 40 | 0.4 | 0.4 |
| 1000 | HIGH | LARGE | 900 | 0.35 | 1 | 40 | 0.4 | 0.4 |
| · | | | | | | | | |

F I G. 1 2

NONLINEAR OPTICAL MICROSCOPE APPARATUS

CROSS-REFERENCE TO RELATED APPLICATIONS

This application is based upon and claims the benefit of priority from prior Japanese Patent Application No. 2013-118936, filed on Jun. 5, 2013, the entire contents of which are incorporated herein by this reference.

BACKGROUND OF THE INVENTION

1. Field of the Invention

The present invention relates to a nonlinear optical microscope apparatus, and more particularly, to a nonlinear optical microscope apparatus used to observe a living sample.

2. Description of the Related Art

In recent years, in vivo imaging for observing a living organism alive has been actively studied to elucidate bio-functions. For in vivo imaging, diverse nonlinear optical microscopes using a nonlinear optical phenomenon, such as a multi-photon excitation microscope and the like, are used.

Also in nonlinear optical microscopes as well as other microscopes, it is desirable to make a laser beam incident to an objective so that a pupil of the objective is filled in order to implement a high resolution by fully taking advantage of performance of a nonlinear optical microscope. In the meantime, it is desirable to make the laser beam incident to the objective in a state where a beam diameter is slightly smaller than a pupil diameter of the objective in order to obtain a brighter image.

As described above, it is conventionally known that brightness and a resolution are varied by changing a beam diameter with respect to a pupil diameter of an objective. A technique related to this fact is disclosed, for example, by Japanese Laid-open Patent Publication No. 2010-096813.

Japanese Laid-open Patent Publication No. 2010-096813 discloses simulation results such that an intensity of fluorescence exhibits a peak when a normalized beam diameter (a beam diameter/a pupil diameter of an objective) is approximately 0.8 in a two-photon excitation microscope apparatus.

SUMMARY OF THE INVENTION

One aspect of the present invention provides a nonlinear optical microscope apparatus including: an objective for irradiating a laser beam on a sample; a beam diameter change unit for changing a beam diameter of the laser beam incident to the objective; and a control unit for deciding, for each of optical characteristics of the sample, a pupil filling ratio, which is a ratio of the beam diameter of the laser beam incident to the objective to a pupil diameter of the objective, based on the optical characteristics of the sample, and for controlling the beam diameter change unit so that the pupil filling ratio becomes the decided value.

Another aspect of the present invention provides a nonlinear optical microscope apparatus including: an objective for irradiating a laser beam on a sample; a beam diameter change unit for changing a beam diameter of the laser beam incident to the objective; a control unit for deciding a recommended range of a pupil filling ratio, which is a ratio of the beam diameter of the laser beam incident to the objective to a pupil diameter of the objective, based on optical characteristics of the sample; a display unit for displaying the recommended range decided by the control unit; and an input unit with which a user designates a pupil filling ratio to be set. In this apparatus, the control unit controls the beam diameter change unit so that the pupil filling ratio becomes the pupil filling ratio designated by the user.

BRIEF DESCRIPTION OF THE DRAWINGS

The present invention will be more apparent from the following detailed description when the accompanying drawings are referenced.

FIG. 3 illustrates an example of a relationship between a spot and a fluorescent illuminant;

FIG. 4 illustrates another example of the relationship among the pupil filling ratio, the observation depth, and the brightness of a fluorescence image in the two-photon excitation microscope apparatus;

FIG. 8 illustrates an example of GUI components displayed on a setting screen of the two-photon excitation microscope apparatus according to the first embodiment of the present invention;

FIG. 9A illustrates a modification example of a GUI component displayed on the setting screen of the two-photon excitation microscope apparatus according to the first embodiment of the present invention;

FIG. 10A illustrates an example of a recommended pupil filling ratio table for an excitation wavelength of 900 nm;

FIG. 10B illustrates an example of a recommended pupil filling ratio table for an excitation wavelength of 1000 nm;

FIG. 12 illustrates an example of a user setting table;

DESCRIPTION OF THE EMBODIMENTS

A nonlinear optical microscope apparatus according the present invention controls a ratio of a beam diameter of a laser beam incident to an objective to a pupil diameter of the objective (the beam diameter/the pupil diameter of the objective: hereinafter referred to as a pupil filling ratio) to a suitable value by taking into account the phenomenon that not all of the laser beam incident to the objective contributes to an occurrence of nonlinear response light.

Characteristics of the present invention are described below by taking, as an example, a two-photon excitation fluorescence microscope, which is one of nonlinear optical microscope apparatuses.

As described above, it is conventionally known that an image brighter than that acquired by matching a beam diameter of a laser beam incident to an objective with a pupil diameter of the objective can be obtained by making the beam diameter smaller than the pupil diameter of the objective, namely, by narrowing the laser beam to make a pupil filling ratio smaller than "1". It is deemed that a base portion of a Gaussian intensity distribution of the laser beam is vignetted by the objective and an image becomes darker by the light quantity of the vignetted beam if the beam diameter is matched with the pupil diameter of the objective. Note that the beam diameter is defined as a light flux diameter of, for example, a portion having an intensity by $e^{-2}$ times or more of a peak intensity of a laser beam having a Gaussian intensity distribution.

As described above, the conventionally known technique narrows a laser beam to be smaller than a pupil diameter of an objective in order to make a more light quantity of the laser beam incident to the objective. In other words, there is no need to narrow the beam diameter any more if the light quantity of the laser beam incident to the objective is unchanged or changed slightly, or the beam diameter should not be narrowed any more if it is taken into account a degradation of resolution, which is caused by narrowing the beam diameter.

In the meantime, according to the present invention, a beam diameter is controlled to be smaller depending on an optical characteristic of a sample and an observation depth, even if the light quantity of a laser beam incident to an objective is unchanged or changed sufficiently slightly. The reason is as follows. Since scattering or an aberration occurs within a sample, not all of the laser beam incident to an objective reaches an observation plane of the sample, and the light quantity of the laser beam that reaches the observation plane varies depending on a beam diameter even when the light quantity of the laser beam incident to the objective is constant.

Figure 1A:
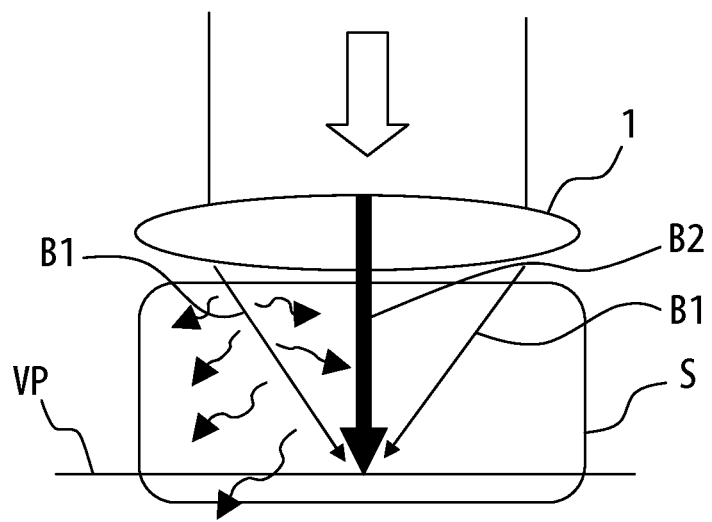
FIG. 1A is an explanatory diagram of a relationship between a numerical aperture and scattering of a light beam.

This point is further described in detail. For example, as illustrated in FIG. 1A, making a comparison between a light beam B1 having a large NA (Numerical Aperture) and a light beam B2 having a small NA, an optical path length of the light beam B1 is longer than that of the light beam B2 from when the beam is emitted from an objective 1 until it reaches an observation plane VP. Therefore, the light beam B1 is more prone to scatter and difficult to reach the observation plane VP. Accordingly, the light quantity of the laser beam that reaches the observation plane VP is increased by making the beam diameter smaller if scattering within the sample S is taken into account.

Figure 1B:
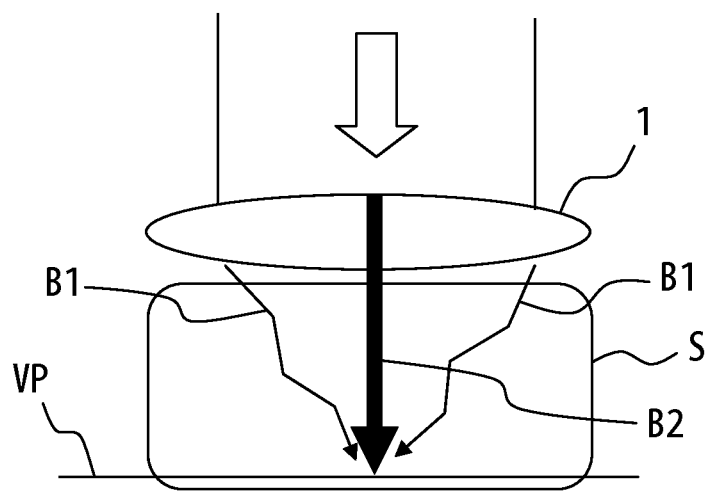
FIG. 1B is an explanatory diagram of a relationship between a numerical aperture and an aberration of a light beam.

Additionally, for example, as illustrated in FIG. 1B, if uniformity of a refractive index of the sample S is low even when an aberration of the objective is satisfactorily corrected, an aberration is caused by a refractive index distribution of the sample S, leading to a degradation of image forming performance. Since an aberration of the light beam B1 is higher than that of the light beam B2 in this case, the light beam B1 is more difficult to reach the observation plane VP. Accordingly, if the aberration caused within the sample S is taken into account, the light quantity of the laser beam that reaches the observation plane VP is increased by making the beam diameter smaller.

Furthermore, as the observation plane VP is deeper from a surface of the sample or as the sample S is more prone to scatter, the light quantity of the laser beam that reaches the observation plane VP is more altered by changing the beam diameter. Accordingly, it can be expected that a nonlinear optical microscope apparatus that can observe a sample prone to scatter, such as a living sample or the like, up to its deep portion, produces effects higher than those produced with other microscopes by adjusting a beam diameter.

As described above, an image is less susceptible to influences exerted by scattering and an aberration within a sample as a beam diameter is increasingly narrowed. However, a brighter image is not always obtained as the beam diameter is narrowed. If NA is reduced by narrowing the beam diameter, a spot diameter at a light condensing position widens, leading to a degradation of a photon density and two-photon absorption efficiency on an observation plane VP. Accordingly, if the beam diameter is excessively narrowed, an image becomes darker although the light quantity of a light beam that reaches the observation plane VP increases. Measurement results that prove this phenomenon are illustrated in FIG. 2.

Figure 2:
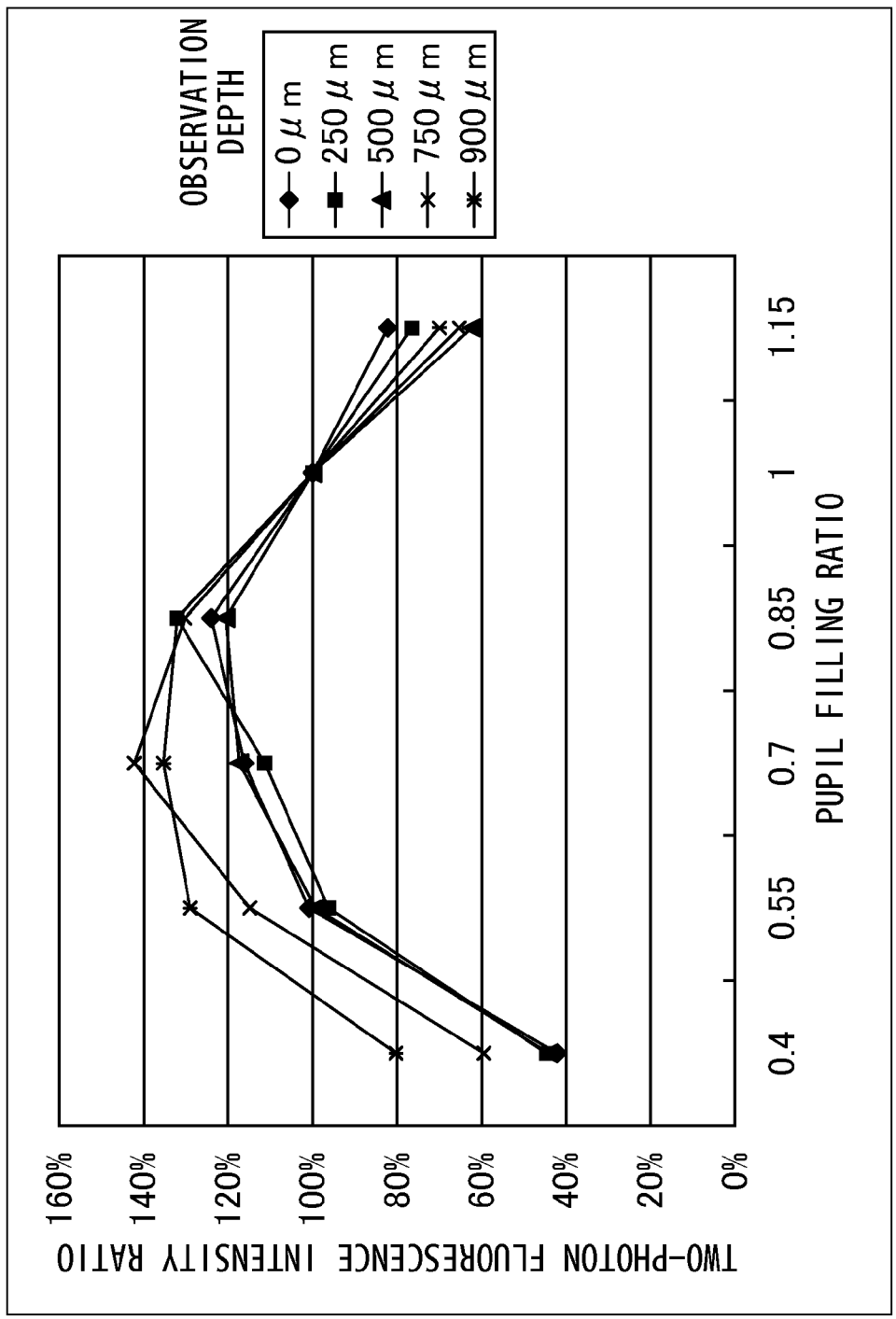
FIG. 2 illustrates an example of a relationship among a pupil filling ratio, an observation depth, and brightness of a fluorescence image in a two-photon excitation microscope apparatus.

FIG. 2 illustrates an example of a relationship among a pupil filling ratio, an observation depth, and brightness of a fluorescence image in the two-photon excitation microscope apparatus. FIG. 2 illustrates results brought by measuring an intensity of fluorescence (hereinafter referred to as a two-photon excitation fluorescence intensity) from a sample, which is detected by a photodetector, while changing the pupil filling ratio and the observation depth. A horizontal axis and a vertical axis of FIG. 2 respectively indicate the pupil filling ratio, and a two-photon excitation fluorescence intensity (hereinafter referred to as a two-photon excitation fluorescence intensity ratio) normalized when a two-photon excitation fluorescence intensity detected when the pupil filling ratio at each observation depth is "1" is assumed as 100 percent.

As illustrated in FIG. 2, if the beam diameter is excessively narrowed, namely, if the pupil filling ratio is excessively reduced, the two-photon excitation fluorescence intensity ratio (namely, brightness of a fluorescence image) decreases although the light quantity of the laser beam that reaches the observation plane VP increases. Moreover, the two-photon excitation fluorescence intensity ratio reaches a peak at the pupil filling ratio of 1 or smaller regardless of the observation depth. However, the peak tends to shift to a direction of a smaller pupil filling ratio as the observation depth increases.

The measurement results illustrated in FIG. 2 are those brought in a case illustrated in FIG. 3, where a fluorescent illuminant 2 within the sample S is smaller than a spot 3 (namely, the spread of a point spread function (PSF)) formed by the laser beam on the observation plane. In contrast, FIG. 4 illustrates measurement results brought in a case illustrated in FIG. 5, in which the fluorescent illuminant 2 is larger than the spot 3 formed on the observation plane. Making a comparison between FIGS. 2 and 4, it is proved that the two-photon excitation fluorescence intensity ratio in FIG. 4 has a peak at a pupil filling ratio smaller than that in FIG. 2.

The reason why such a difference occurs can be explained as follows. In the case where the fluorescent illuminant 2 is smaller than the spot 3 as illustrated in FIG. 3, the entire fluorescent illuminant 2 emits light regardless of the size of the spot 3. Therefore, as the spot 3 is decreased, namely, as the NA is increased by making the beam diameter larger, a photon density increases and a two-photon absorption rate rises. Accordingly, if the light quantity of the laser beam that forms the spot 3 is constant, a brighter image can be obtained as the spot 3 becomes smaller. Accordingly, the two-photon excitation fluorescence intensity ratio reaches a peak at a relatively high pupil filling ratio if the pupil filling ratio starts to be reduced at a point where the beam diameter is large and the pupil filling ratio is high as illustrated in FIG. 2. Thereafter, by further making the beam diameter smaller to decrease the pupil filling ratio, the NA is degraded and the spot 3 is widened. Therefore, the light quantity of the laser beam that misses the fluorescent illuminant 2 increases (the right side of FIG. 3), leading to a decrease in the two-photon excitation fluorescence intensity ratio.

Figure 5:
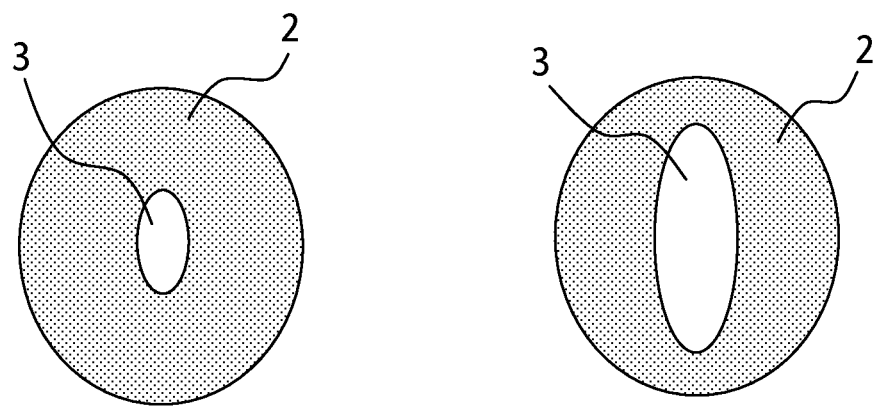
FIG. 5 illustrates another example of the relationship between the spot and the fluorescent illuminant.

In contrast, in the case where the fluorescent illuminant 2 is larger than the spot 3 as illustrated in FIG. 5, the point that the photon density increases with a decrease in the spot 3 is the same as that in the case illustrated in FIG. 3. However, a volume of a light emitting portion within the fluorescent illuminant 2 increases as the spot 3 becomes larger. Accordingly, unlike the case illustrated in FIG. 3, there is no simple relationship that the two-photon absorption rate increases with a decrease in the spot 3 and a brighter image can be obtained. Therefore, compared with the case illustrated in FIG. 3, the light quantity of the laser beam that misses the fluorescent illuminant 2 does not increase (the right side of FIG. 5) even if the NA decreases and the spot 3 has a larger spot diameter with a decrease in NA. Thus, a brighter image can be obtained at a smaller pupil filling ratio, namely, with a smaller beam diameter. Accordingly, the two-photon excitation fluorescence intensity ratio reaches a peak at a smaller pupil filling ratio as illustrated in FIG. 4.

In summary, the brightness of an image reaches a peak at a smaller pupil filling ratio as an observation depth increases. Moreover, the brightness of the image reaches a peak at a smaller pupil filling ratio in a case where the illuminant is larger than the spot formed by the laser beam rather than in a case where the illuminant is smaller than the spot. Additionally, the brightness of the image reaches a peak at a smaller pupil filling ratio as scattering or an aberration is more prone to occur within the sample. On the basis of these conclusions, the nonlinear optical microscope apparatus according to the present invention decides a suitable pupil filling ratio based on optical characteristics of a sample (a scattering characteristic of a sample, the size of an illuminant, and uniformity of a refractive index). Note that the suitable pupil filling ratio may be decided based on an observation depth (a depth from a surface of a sample) and the optical characteristics of the sample. At that time, the pupil filling ratio may be decreased as the observation depth increases. Moreover, scattering within the sample is more prone to occur as a wavelength of a laser beam reduces. Therefore, a suitable pupil filling ratio may be decided based on a wavelength of a laser beam in addition to the observation depth and the optical characteristics of the sample.

Embodiments according to the present invention are specifically described below.

First Embodiment

Figure 6:
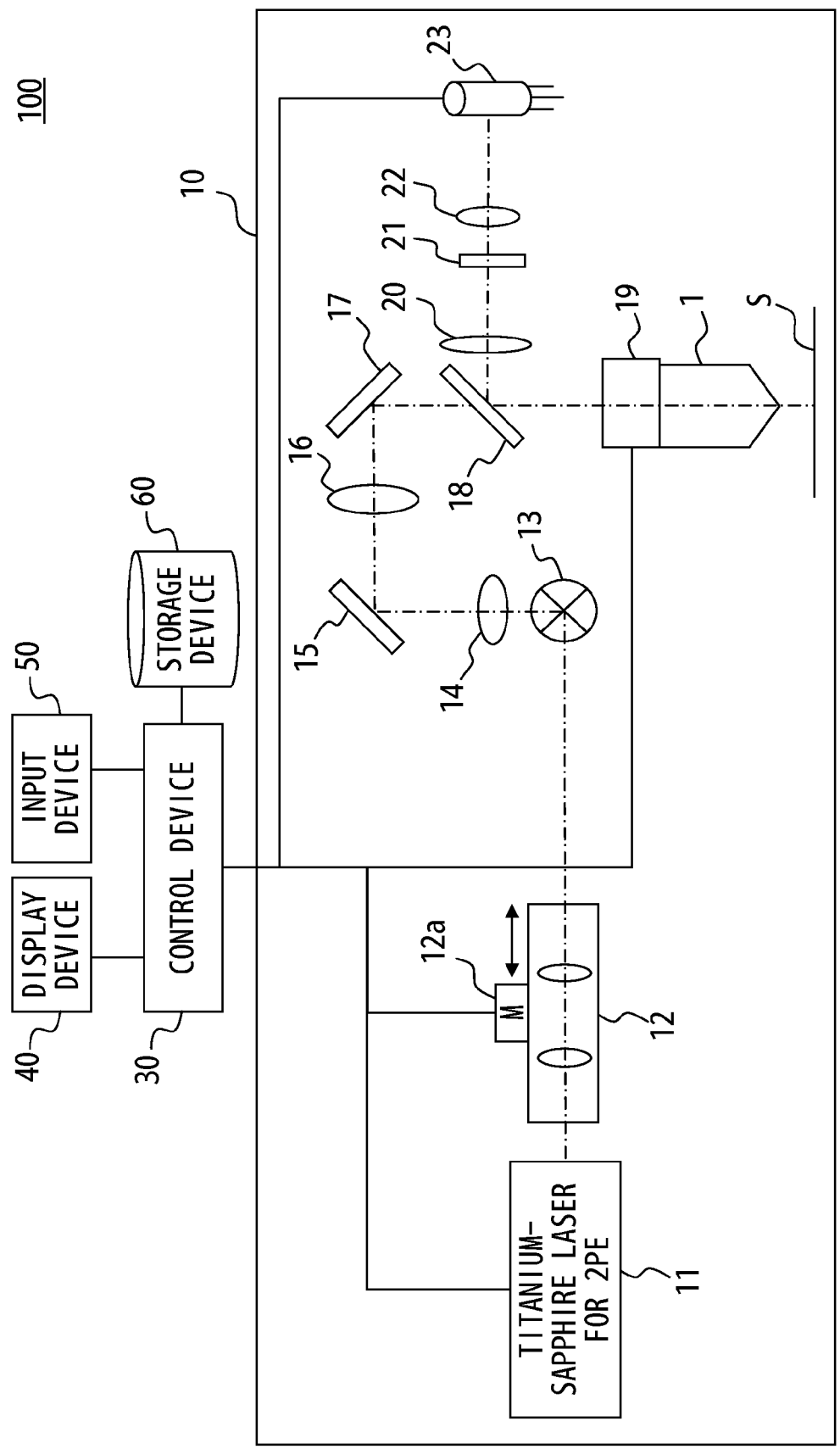
FIG. 6 illustrates a configuration of a two-photon excitation microscope apparatus according to a first embodiment of the present invention.

FIG. 6 illustrates a configuration of a two-photon excitation microscope apparatus 100 according to a first embodiment. The two-photon excitation microscope apparatus 100 obtains a satisfactory image of a sample by controlling a pupil filling ratio to a suitable value according to an observation depth and optical characteristics of the sample.

The configuration of the two-photon excitation microscope apparatus 100 is initially described with reference to FIG. 6. The two-photon excitation microscope apparatus 100 is a nonlinear optical microscope apparatus having a two-photon excitation microscope 10 including a titanium-sapphire laser 11, a control device 30, a display device 40, an input device 50, and a storage device 60 as illustrated in FIG. 6.

The two-photon excitation microscope 10 includes, on an optical path of the laser beam from the titanium-sapphire laser 11 to the sample S, a beam diameter variable optics system 12, a galvano mirror 13, a pupil projection relay lens 14, a mirror 15, a tube lens 16, a mirror 17, a dichroic mirror 18, a focus moving unit 19, and objectives 1 for irradiating a laser beam on the sample S. The two-photon excitation microscope 10 includes a revolver not illustrated. The revolver holds a plurality of objectives including the objective 1 to be switchable.

The two-photon excitation microscope 10 further includes a lens 20, an infrared ray cut filter (hereinafter abbreviated to an IR cut filter) 21, a lens 22, and a photomultiplier (hereinafter abbreviated to PMT) 23 on a reflected light path (detected light path) of the dichroic mirror 18 for reflecting fluorescence from the sample S.

The titanium-sapphire laser 11 is a laser for two-photon excitation, which emits an infrared laser beam, and emits pulsed light having a pulse width on the order of picoseconds. The titanium-sapphire laser 11 changes an intensity and a wavelength of the laser beam to be emitted under the control of the control device 30.

The beam diameter variable optics system 12 is an optics system for varying a beam diameter with a move of a lens that configures the beam diameter variable optics system 12 in an optical axis direction, and is a beam diameter change unit for changing the beam diameter of a laser beam incident to the objective 1. The beam diameter variable optics system 12 includes a driving unit 12a composed of a motor and the like, and changes the beam diameter of the laser beam in a way such that the driving unit 12a moves the lens in the optical axis direction.

The galvano mirror 13 is scanning means for scanning the sample S with the laser beam. The galvano mirror 13 is arranged at a position optically conjugate with a pupil position of the objective 1. Namely, in the two-photon excitation microscope 10, an image of the galvano mirror 13 is formed at the pupil position of the objective 1 by the pupil projection relay lens 14 and the tube lens 16. Accordingly, the galvano mirror 13 deflects incident light, so that a light condensing position of the sample S can be moved in an XY direction orthogonal to the optical axis.

The dichroic mirror 18 is optical path split means for splitting into an illumination light path and a detected light path, and has a characteristic of transmitting the laser beam emitted from the titanium-sapphire laser 11, and of reflecting fluorescence generated from the sample S.

The focus moving unit 19 is means for changing a distance between the sample S and the objective 1. The focus moving unit 19 is, for example, a driving device for moving the objective 1 in the optical axis direction, or a driving device for moving a stage, on which the sample S is placed, in the optical axis direction. The focus moving unit 19 changes a position relationship between the sample S and the light condensing position of the laser beam in the optical axis direction under the control of the control device 30.

The IR cut filter 21 is a filter for preventing the laser beam from being incident to the PMT 23 by blocking the infrared laser beam.

The PMT 23 is a photodetector for detecting fluorescence, which is nonlinear response light, and arranged in the neighborhood of a position optically conjugate with the pupil position of the objective 1. Namely, in the two-photon excitation microscope 10, the pupil of the objective 1 is projected by the lens 20 and the lens 22 in the neighborhood of the PMT 23. Accordingly, fluorescence that can be generated from an arbitrary area of the sample S can be detected.

The control device 30 is a control unit for controlling the entire two-photon excitation microscope apparatus 100. The control device 30 is, for example, a personal computer. The control device 30 is configured to decide a pupil filling ratio based on optical characteristics of the sample S, which are information input from the input device 50, more preferably, based on the depth of an observation plane within the sample S and the optical characteristics of the sample S, and to control the beam diameter variable optics system 12 so that the pupil filling ratio becomes the decided value. The pupil filling ratio is decided, more preferably, based on the observation depth, the optical characteristics of the sample S, and a wavelength of the laser beam.

Additionally, the control device 30 changes the intensity and the wavelength of the laser beam, the observation depth, a voltage applied to the PMT 23, and the like by controlling the titanium-sapphire laser 11, the focus moving unit 19, and the PMT 23 based on the information input from the input device 50. The control device 30 may also change an objective to be used, a scanning speed, and the like by controlling the revolver, not illustrated, for holding the objective 1, and the galvano mirror 13 based on the information input from the input device 50.

The display device 40 is a display unit for displaying a sample image and a GUI (Graphical User Interface) screen for operating the two-photon excitation microscope apparatus 100. The display device 40 is, for example, a liquid crystal display device or an organic EL (Electroluminescence) display device. The input device 50 is an input unit with which a user inputs information to the two-photon excitation microscope apparatus 100. The input information is output to the control device 30. The input device 50 is, for example, a mouse, a keyboard, or a touch panel arranged by being stacked on a display of the display device 40.

The storage device 60 is a storage unit for storing a control program of the two-photon excitation microscope apparatus 100, and various items of information used in the control program. The storage device 60 is, for example, a hard disk device. In the storage device 60, information that makes an association among an observation depth, optical characteristics of the sample, a wavelength of the laser beam and a pupil filling ratio as information with which the control device 30 decides the pupil filling ratio based on an input from the input device 50. Note that the storage device 60 may be provided within the control device 30.

Figure 7:
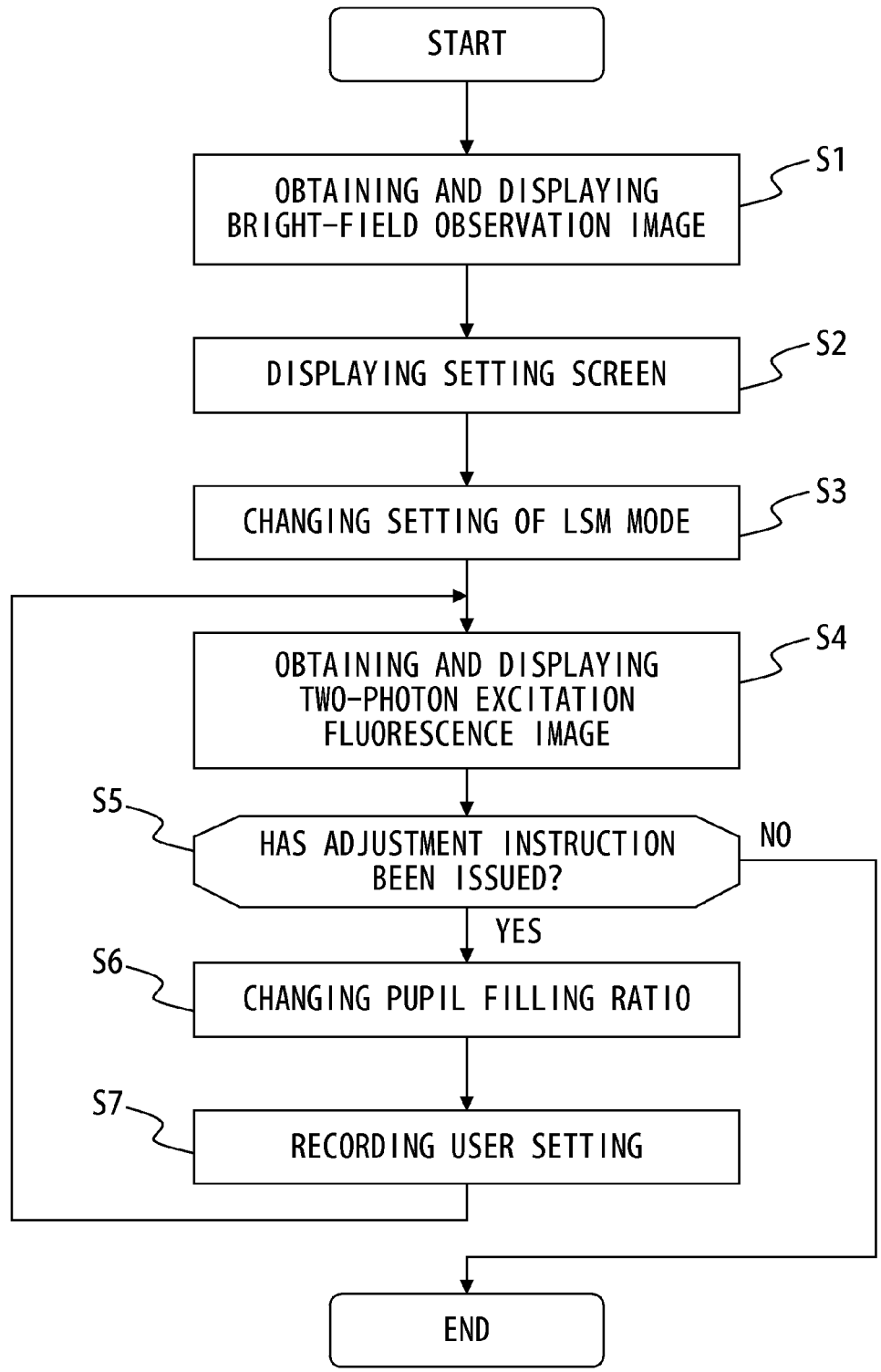
FIG. 7 is a flowchart illustrating setting procedures of the two-photon excitation microscope apparatus according to the first embodiment of the present invention.

FIG. 7 is a flowchart illustrating setting procedures of the two-photon excitation microscope apparatus 100. The setting procedures for obtaining a satisfactory image of a sample by the two-photon excitation microscope apparatus 100 are described with reference to FIG. 7.

When the sample S is placed on the stage, the two-photon excitation microscope apparatus 100 initially obtains a bright-field observation image of the sample S, and causes the display device 40 to display the obtained bright-field observation image (step S1). A user of the two-photon excitation microscope apparatus 100 moves the stage so that a portion to be observed (referred to as an observation portion) is positioned within a field of view while viewing the bright-field observation image. Note that the two-photon excitation microscope apparatus 100 includes illumination means for illuminating a plane of the sample S, and an image pickup element arranged at a position optically conjugate with the plane of the sample although they are not illustrated in FIG. 6. The bright-field observation image is obtained by using these components.

After step S1, a user switches an operation mode of the two-photon excitation microscope apparatus 100 to a mode for obtaining a two-photon excitation fluorescence image of the sample S (hereinafter referred to as LSM mode), so that the two-photon excitation microscope apparatus 100 causes the display device 40 to display a screen (hereinafter referred to as a setting screen) for inputting various items of information of the LSM mode (step S2).

FIG. 8 illustrates an example of GUI components displayed on the setting screen. As illustrated in FIG. 8, on the setting screen displayed in step S2, a GUI component 41 including a textbox for setting an observation depth, a GUI component 42 including radio buttons for setting a scattering characteristic of the sample S, and a GUI component 43 including radio buttons for setting the size of an illuminant within the S are displayed.

The user can change a setting of the observation depth by inputting a value that indicates the observation depth in the textbox of the GUI component 41. The two-photon excitation microscope apparatus 100 obtains the value input in the textbox, and controls the focus moving unit 19 so that the observation depth becomes a depth indicated by the obtained value. Thus, the depth of the observation plane within the sample S can be made to match the observation depth set in the textbox. The example where the focus moving unit 19 automatically changes the observation depth based on the value input in the textbox has been provided. However, the focus moving unit 19 may be configured to change the observation depth based on an operation of the user.

Figure 9B:
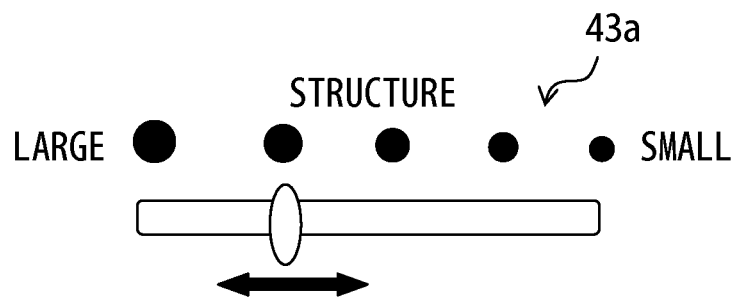
FIG. 9B illustrates another modification example of the GUI component displayed on the setting screen of the two-photon excitation microscope apparatus according to the first embodiment of the present invention.

The user can set the scattering characteristic of the sample S by selecting any of the radio buttons of the GUI component 42. For example, "high" is selected if the sample S is a sample more prone to scatter, such as the brain or the like, "low" is selected if the sample S is a sample that is nearly transparent and less prone to scatter, or "medium" is selected if the degree of scattering in the sample S is almost between "high" and "low". Note that the scattering characteristic of the sample S may be set with a GUI component 42a including a slider illustrated in FIG. 9A as a replacement for the GUI component 42.

The user can set the size of the illuminant within the sample S by selecting any of the radio buttons of the GUI component 43. For example, "large" is selected if the size of the illuminant within the sample S is larger than the spot diameter, "medium" is selected if the size of the illuminant within the sample S is approximately the same as the spot diameter, or "small" is selected if the size of the illuminant within the sample S is smaller than the spot diameter. Note that the size of the illuminant within the sample S may be set with a GUI component 43a including a slider illustrated in FIG. 9B as a replacement for the GUI component 43.

The setting information input on the setting screen includes, for example, setting information about the titanium-sapphire laser 11, such as an intensity, a wavelength and the like of a laser beam, setting information about the PMT 23, such as an applied voltage and the like, setting information about the galvano mirror 13, such as a scanning speed and the like, setting information about an optical path including selections of a filter and a mirror, and setting information about an objective to be used, such as a magnification and a numerical aperture, in addition to the above described setting information although these setting information are not illustrated.

After step S2, the two-photon excitation microscope apparatus 100 changes the setting of the LSM mode (step S3). Here, settings of the components are changed by obtaining the setting information input on the setting screen. How to change the setting of the beam diameter variable optics system 12 is specifically described.

Initially, the two-photon excitation microscope apparatus 100 decides a pupil filling ratio based on the information about a wavelength of the laser beam, an observation depth, the scattering characteristic of the sample S, and the size of the illuminant among the above described setting information by referencing a recommended pupil filling ratio table, which is provided in the storage device 60 and stores recommended values of pupil filling ratios.

For example, if the wavelength of the laser beam, the observation depth, the scattering characteristic of the sample S, and the size of the illuminant are 900 nm, 1000 μm, "high", and "large" respectively, the two-photon excitation microscope apparatus 100 obtains a recommended value of the pupil filling ratio "0.35" from a recommended pupil filling ratio table for an excitation wavelength of 900 nm, which is illustrated in FIG. 10A, and decides the pupil filling ratio to be set to the obtained recommended value "0.35".

In the storage device 60, a recommended pupil filling ratio table is provided for each wavelength (excitation wavelength) of a laser beam. FIG. 10A illustrates the recommended pupil filling ratio table for the excitation wavelength of 900 nm, whereas FIG. 10B illustrates a recommended pupil filling ratio table for an excitation wavelength of 1000 nm. The recommended pupil filling ratio table is a table that stores a recommended value of a pupil filling ratio, with which the brightest image can be obtained under each condition, and created in advance with a recommended pupil filling ratio table creation process to be described later. When an optical characteristic of the sample is the same, recommended values of pupil filling ratios, which are stored in the recommended pupil filling ratio table, decrease as an observation depth increases as illustrated in FIGS. 10A and 10B. Moreover, when the observation depth is the same, recommended values decreases as the scattering characteristic of the sample increases and the size of the illuminant within the sample grows. Additionally, when the observation depth and the optical characteristic of the sample are the same, recommended values decrease as the wavelength (excitation wavelength) of the laser beam reduces.

An attenuation value of a two-photon excitation efficiency, which is caused by scattering, is represented by $\exp(-\mu s(\lambda) \cdot d) \cdot 2$ when an observation depth, a scattering coefficient, and a wavelength are assumed to be d, $\mu s(\lambda)$, and $\lambda$ respectively. For example, if a ratio of an attenuation at the excitation wavelength of 1000 nm to that at the excitation wavelength of 900 nm, which is calculated with this expression, (namely, the ratio of the attenuation at the excitation wavelength 1000 nm/the attenuation at the excitation wavelength of 900 nm) is ½, it can be judged that the two-photon excitation efficiency of 1000 nm is less prone to attenuate twice that of 900 nm. Accordingly, as illustrated in FIG. 10B, the recommended pupil filling ratio table for the excitation wavelength of 1000 nm is a table implemented by doubling the observation depth of the recommended pupil filling ratio table for the excitation wavelength of 900 nm, which is illustrated in FIG. 10A. As described above, if a recommended pupil filling ratio table for a particular wavelength is present, a recommended pupil filling ratio table for another wavelength can be easily created by using a ratio between attenuation values of wavelengths. Accordingly, if an attenuation ratio between wavelengths is known, it is sufficient to create only a recommended pupil filling ratio table for a particular wavelength in advance in the storage device 60. Thereafter, a pupil filling ratio table for a needed wavelength may be created as occasion demands.

After the pupil filling ratio is decided, the two-photon excitation microscope apparatus 100 (the control device 30) controls the beam diameter variable optics system 12 so that the pupil filling ratio becomes the decided value. In this way, the setting of the beam diameter variable optics system 12 is changed.

When the user inputs an instruction to obtain a two-photon excitation fluorescence image after the settings of the LSM mode, which include the setting of the beam diameter variable optics system 12, are changed in step S3, the two-photon excitation microscope apparatus 100 obtains the two-photon excitation fluorescence image of the sample S, and causes the display device 40 to display the obtained image (step S4). The user determines whether or not the pupil filling ratio needs to be adjusted while viewing the two-photon excitation fluorescence image displayed on the display device 40.

The two-photon excitation microscope apparatus 100 determines whether or not the user has issued an instruction to adjust the pupil filling ratio (step S5). If the two-photon excitation microscope apparatus 100 determines that the user has issued the instruction, the apparatus changes the pupil filling ratio according to the input of the user (step S6). In contrast, if the two-photon excitation microscope apparatus 100 determines that the user has not issued the instruction, the apparatus terminates the setting process illustrated in FIG. 7.

Figure 11:
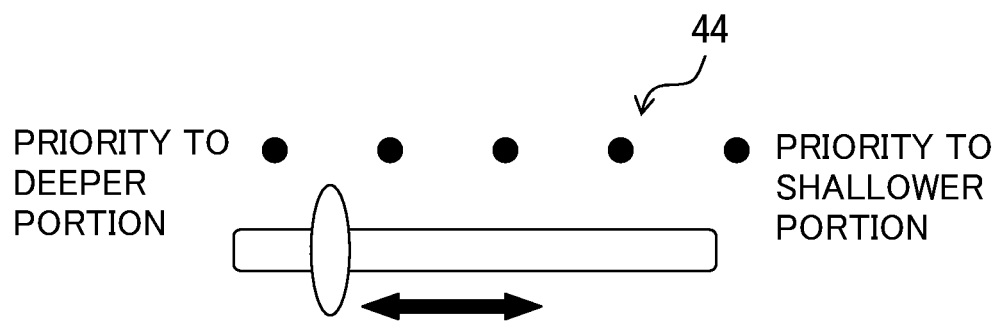
FIG. 11 illustrates a GUI component displayed on the setting screen of the two-photon excitation microscope apparatus according to the first embodiment of the present invention when a pupil filling ratio is adjusted.

In step S6, a GUI component 44 including a slider, which is illustrated in FIG. 11 and with which the user directly adjusts a pupil filling ratio, is displayed on the setting screen. Then, the two-photon excitation microscope apparatus 100 changes the pupil filling ratio by controlling the beam diameter variable optics system 12 according to a position of the slider of the GUI component 44. More specifically, the two-photon excitation microscope apparatus 100 controls the beam diameter variable optics system 12 so that the effective NA, namely, the pupil filling ratio decreases as the user moves the slider of the GUI component 44 toward the side for giving a priority to a deeper portion. Alternatively, the two-photon excitation microscope apparatus 100 controls the beam diameter variable optics system 12 so that the effective NA, namely, the pupil filling ratio of the objective 1 increases as the user moves the slider of the GUI component 44 toward the side for giving a priority to a shallower portion. Accordingly, the user can directly adjust the setting of the pupil filling ratio by moving the slider of the GUI component 44.

Preferably, the initial position of the slider of the GUI component 44 displayed on the setting screen is a position that corresponds to the current pupil filling ratio. By making the initial position correspond to the current pupil filling ratio, the user may move the slider of the GUI component 44 toward the side for giving the priority to a shallower portion if it is determined that the resolution of the two-photon excitation fluorescence image displayed in step S4 is insufficient. As a result, it becomes very easy to adjust the pupil filling ratio.

After the pupil filling ratio is changed in step S6, the two-photon excitation microscope apparatus 100 stores the pupil filling ratio after being changed as a user setting (step S7). Here, the two-photon excitation microscope apparatus 100 stores the pupil filling ratio after being changed in a user setting table provided in the storage device 60 in association with the observation depth, the optical characteristics of the sample, the wavelength a laser beam, and the like. Note that the user setting table may be referenced as a replacement for the recommended pupil filling ratio table in step S2 if the user issues an instruction to reference the user setting table.

In the storage device 60, a user setting table is provided for each sample. FIG. 12 illustrates the user setting table for the sample S. In entries of "depth", "scattering", and "sample size" in the user setting table, setting values of the GUI component 41, the GUI component 42 and the GUI component 43, which are illustrated in FIG. 8, are stored. In an entry of "wavelength", a wavelength of the laser beam emitted from the titanium-sapphire laser 11 is stored. In an entry of "optimum effective NA", a product of a pupil filling ratio decided by referencing the recommended pupil filling ratio table in step S3 and a numerical aperture of the objective 1 (for example, 0.35 when the recommended value of the pupil filling ratio and the numerical aperture of the objective 1 are 0.35 and 1 respectively) is stored. In an entry of "objective type", a numerical aperture of the objective 1 is stored. In an entry of "slider position", the position of the slider of the GUI component 44 is stored. The value of the position of the slider is "0" when the slider is positioned at an end on the side for giving a priority to a deeper portion, or "100" when the slider is positioned at an end on the side for giving a priority to a shallower portion. In an entry of "setting effective NA", a value obtained by dividing the product of the numerical aperture of the objective 1 and the value of the position of the slider by 100 (for example, 0.4 when the numerical aperture of the objective 1 and the value of the position of the slider are 1 and 40 respectively) is stored. In an entry of "pupil filling ratio", a value obtained by dividing the value of the position of the slider by 100 is stored.

Upon completion of the user setting table update process in step S7, the two-photon excitation microscope apparatus 100 returns the process to step S4, and repeats the above described process until the user issues an instruct to need no more adjustments.

Figure 13:
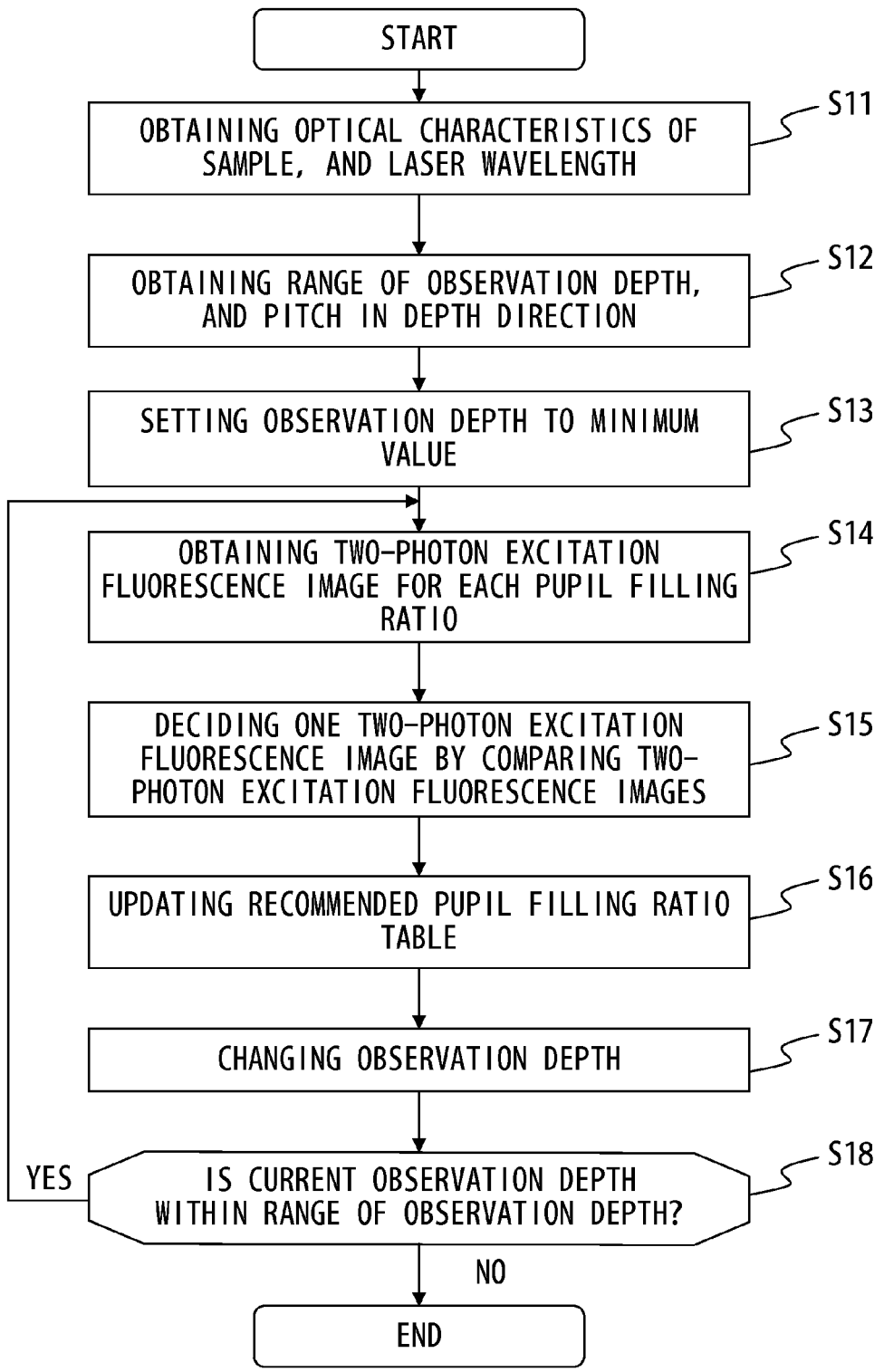
FIG. 13 is a flowchart illustrating procedures of a recommended pupil filling ratio table creation process executed by the two-photon excitation microscope apparatus according to the first embodiment of the present invention.

FIG. 13 is a flowchart illustrating procedures of the recommended pupil filling ratio table creation process of the two-photon excitation microscope apparatus 100. The procedures of the recommended pupil filling ratio table creation process are described with reference to FIG. 13. By way of example, samples having optical characteristics of a total of 9 types, which are obtained by combining "high", "medium" and "low" of the scattering characteristic, and "large", "medium" and "small" of the size of the illuminant, are prepared for the recommended pupil filling ratio table creation process illustrated in FIG. 13, and this process is executed for each of the samples.

Once the recommended pupil filling ratio table creation process illustrated in FIG. 13 is started, the two-photon excitation microscope apparatus 100 initially obtains optical characteristic of the sample placed on the stage, and a wavelength of the laser beam emitted from the titanium-sapphire laser 11 (step S11). Here, the two-photon excitation microscope apparatus 100 obtains the optical characteristics of the sample S (for example, "high" of the scattering characteristic, and "large" of the size of the illuminant) and the wavelength of the laser beam (for example, 900 nm), which a user inputs by using the input device 50.

After step S11, the two-photon excitation microscope apparatus 100 obtains a range of an observation depth, and a pitch in a depth direction (step S12). Here, the two-photon excitation microscope apparatus 100 obtains the range of the observation depth (for example, a range from 0 µm to 1200 µm) and the pitch in the depth direction (for example, 100 µm), which the user inputs by using the input device 50.

After step S12, the two-photon excitation microscope apparatus 100 sets the observation depth to the minimum value (step S13). Here, the two-photon excitation microscope apparatus 100 controls the focus moving unit 19 so that the observation depth becomes a depth indicated by the minimum value (such as 0 µm) of the observation range obtained in step S12.

After step S13, the two-photon excitation microscope apparatus 100 obtains a two-photon excitation fluorescence image for each pupil filling ratio (step S14). Here, the two-photon excitation microscope apparatus 100 obtains, for each pupil filling ratio, a two-photon excitation fluorescence image based on a signal from the PMT 23 and scanning position information of the galvano mirror 13 by controlling the beam diameter variable optics system 12. More specifically, the two-photon excitation microscope apparatus 100 obtains a two-photon excitation fluorescence image at each pupil filling ratio by changing the pupil filling ratio, for example, in increments of 0.05 from 0.3 to 1.0.

After step S14, the two-photon excitation microscope apparatus 100 decides one two-photon excitation fluorescence image having the highest evaluation by comparing a plurality of two-photon excitation fluorescence images obtained in step S14 based on a specified index (step S15). Here, the two-photon excitation microscope apparatus 100 compares the images by using, for example, the brightness of an image as an index. Namely, the two-photon excitation microscope apparatus 100 decides the brightest two-photon excitation fluorescence image based on luminance information of an image.

After step S15, the two-photon excitation microscope apparatus 100 updates a recommended pupil filling ratio table (step S16). Here, the two-photon excitation microscope apparatus 100 stores the pupil filling ratio (such as 0.6), which is used when the two-photon excitation fluorescence image decided in step S15 is obtained, in the recommended pupil filling ratio table in association with the current observation depth (such as 0 µm), the optical characteristics of the sample (such as "high" of the scattering characteristic, and "large" of the size of the illuminant), and the wavelength of the laser beam (such as 900 nm). In other words, the two-photon excitation microscope apparatus 100 stores the pupil filling ratio, which is used when the two-photon excitation fluorescence image decided in step S15 is obtained, in the recommended pupil filling ratio table in association with the optical characteristics of the sample, the observation depth and the wavelength of the laser light, which are obtained when the two-photon excitation fluorescence image is obtained.

After step S16, the two-photon excitation microscope apparatus 100 changes the observation depth (step S17). Here, the two-photon excitation microscope apparatus 100 controls the focus moving unit 19 so that the observation depth increases by the pitch decided in step S12.

After step S17, the two-photon excitation microscope apparatus 100 determines whether or not the current observation depth is within the range of the observation depth, which is decided in step S12 (step S18). If the two-photon excitation microscope apparatus 100 determines that the current observation depth is within the range of the observation depth, the apparatus returns the process to step S14, and repeats the above described process. In contrast, if the two-photon excitation microscope apparatus 100 determines that the current observation depth is not within the range of the observation depth, the apparatus terminates the process illustrated in FIG. 13.

By executing the process illustrated in FIG. 13 for each of the prepared samples, the recommended pupil filling ratio table illustrated in FIG. 10A is created. Note that a recommended pupil filling ratio table having a different wavelength of a laser beam may be created by reexecuting the process illustrated in FIG. 13 after changing the wavelength of the laser beam, or may be created based on an attenuation ratio between wavelengths as described above without reexecuting the process illustrated in FIG. 13.

In the two-photon excitation microscope apparatus 100 according to this embodiment, a pupil filling ratio is decided based on optical characteristic of a sample, more preferably, based on an observation depth and the optical characteristics of the sample. More specifically, the control device 30 decides the pupil filling ratio to be a smaller value as the observation depth increases, the scattering characteristic of the sample rises, or the size of the illuminant grows. Accordingly, with the two-photon excitation microscope apparatus 100, an arbitrary sample can be brightly observed up to a deep portion.

Additionally, in the two-photon excitation microscope apparatus 100, a user only designates an observation depth and optical characteristics of a sample, so that a recommended value of a pupil filling ratio suitable for obtaining a bright image is automatically calculated, and a pupil filling ratio to be set is decided. Accordingly, with the two-photon excitation microscope apparatus 100, a user who does not have expertise in a microscope can brightly observe a sample S up to a deep portion with ease.

Furthermore, in the two-photon excitation microscope apparatus 100, a pupil filling ratio can be changed from a recommended value with a simple operation. Accordingly, with the two-photon excitation microscope apparatus 100, also a subtle adjustment of image quality can be easily made.

This embodiment refers to the example where the scattering characteristic and the size of the illuminant are taken into account as the optical characteristic of the sample and the pupil filling ratio is decided. However, the optical characteristic of the sample are not limited to these ones. For example, uniformity of a refractive index may be taken into account. In this case, after information about the uniformity of the refractive index is added to a recommended pupil filling ratio table, a pupil filling ratio may be decided based on the scattering characteristic, the size of the illuminant, and the uniformity of the refractive index as the optical characteristics of the sample. An aberration is more apt to occur in a light beam that has a larger NA as the uniformity of the refractive index decreases. Therefore, when the observation depth is the same, a recommended value of a pupil filling ratio, which is stored in a recommended pupil filling ratio table, reduces as the scattering characteristic of a sample increases, the size of an illuminant within the sample grows, and the uniformity of a refractive index of the sample decreases.

Additionally, this embodiment refers to the example where the two-photon excitation microscope apparatus 100 compares the plurality of two-photon excitation fluorescence images and the brightest image is decided based on the luminance information of an image in step S15 of the recommended pupil filling ratio table creation process illustrated in FIG. 13. However, the method for deciding a two-photon excitation fluorescence image is not limited to this one.

The two-photon excitation microscope apparatus 100 may cause the display device 40 to display a plurality of two-photon excitation fluorescence images obtained for respective pupil filling ratios. Then, the two-photon excitation microscope apparatus 100 may decide an image, which a user selects from among the plurality of two-photon excitation fluorescence images by using the input device 50, as one two-photon excitation fluorescence image to be decided in step S15. Generally, an evaluation of a resolution of an image, which is made by a computer, is more difficult than that of the brightness of an image. Accordingly, an image that achieves both brightness and a resolution can be decided in step S15 by causing a user to select the image.

Additionally, the two-photon excitation microscope apparatus 100 may decide an image based on luminance information of an image and a pupil filling ratio used when the image is obtained. For example, the brightest image, and images each having a brightness difference from that of the brightest image within a specified range are initially identified based on the luminance information of an image. Then, an image obtained at the highest pupil filling ratio from among the identified images may be decided as one two-photon excitation fluorescence image to be decided in step S15. In this way, an image having a satisfactory resolution as well as brightness can be decided.

Furthermore, the objective 1 may include a correction collar for correcting a spherical aberration caused by fluctuations of an observation depth although it is not illustrated in FIG. 6. On that basis, in the recommended pupil filling ratio table creation process illustrated in FIG. 13, the spherical aberration caused by the fluctuations of an observation depth may be corrected by user's operating the correction collar each time the observation depth is changed, and the storage device 60 may store a setting of the correction collar in association with the observation depth. Note that the setting of the correction collar may be stored in the recommended pupil filling ratio table along with information about the observation depth, the pupil filling ratio and the like in step S16.

Second Embodiment

A two-photon excitation microscope apparatus according to a second embodiment is different from the two-photon excitation microscope apparatus 100 according to the first embodiment in a point that a recommended range of a pupil filling ratio is provided to a user based on optical characteristics of a sample and the user decides a pupil filling ratio instead of deciding a recommended value of the pupil filling ratio based on the optical characteristics of the sample, or on an observation depth and the optical characteristics of the sample.

Note that a configuration of the two-photon excitation microscope apparatus according to this embodiment is similar to the two-photon excitation microscope apparatus 100 according to the first embodiment illustrated in FIG. 6.

Figure 14:
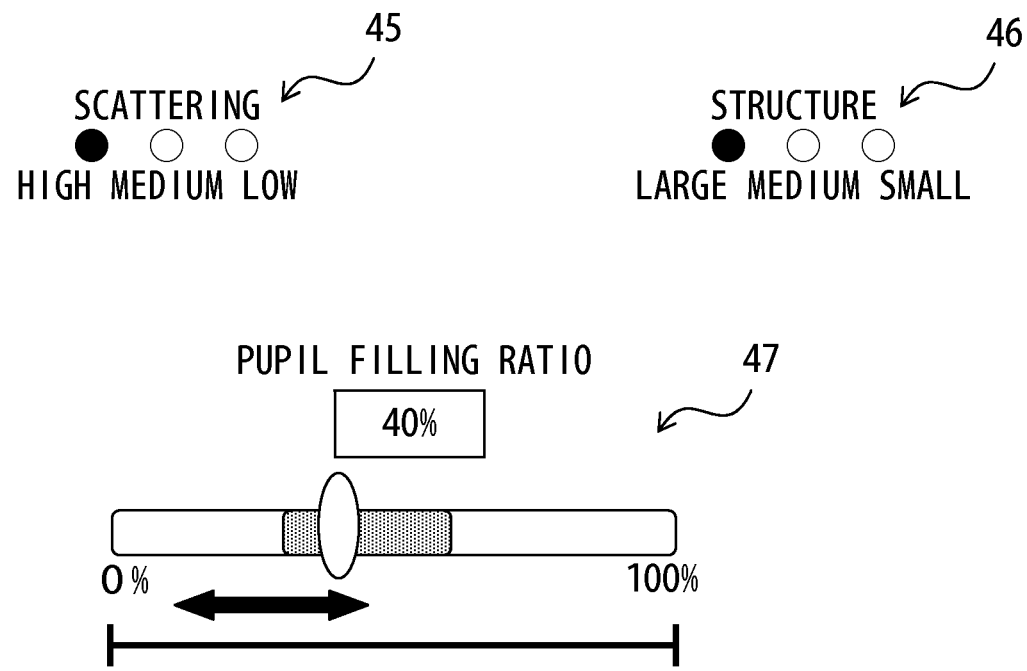
FIG. 14 illustrates an example of GUI components displayed on a setting screen of a two-photon excitation microscope apparatus according to a second embodiment of the present invention.

Differences in setting procedures for obtaining a satisfactory sample image with the two-photon excitation microscope apparatus according to this embodiment from those of the two-photon excitation microscope apparatus 100 according to the first embodiment are described below with reference to FIGS. 7 and 14. FIG. 14 illustrates an example of GUI components displayed on a setting screen of the two-photon excitation microscope apparatus according to this embodiment.

In the two-photon excitation microscope apparatus according to this embodiment, in step S2, a GUI component 45 including radio buttons for setting a scattering characteristic of a sample S, a GUI component 46 including radio buttons for setting a size of an illuminant within the sample S, and a GUI component 47 including a slider for setting a pupil filling ratio are displayed on the setting screen as illustrated in FIG. 14.

A user can set the scattering characteristic of the sample S by selecting any of the radio buttons of the GUI component 45. For example, "high" is selected if the sample S is prone to scatter, such as the brain or the like, "low" is selected if the sample S is a sample that is nearly transparent and difficult to scatter, or "medium" is selected if the degree of scattering in the sample S is almost between "high" and "low".

The user can set the size of the illuminant within the sample S by selecting any of the radio buttons of the GUI component 46. For example, "large" is selected if the size of the illuminant within the sample S is larger than a spot diameter, "medium" is selected if the size of the illuminant within the sample S is almost the same as the spot diameter, or "small" is selected if the size of the illuminant within the sample S is smaller than the spot diameter.

Setting information input on the setting screen include setting information about the titanium-sapphire laser 11, such as an intensity, a wavelength and the like of a laser beam, setting information about the PMT 23, such as an applied voltage and the like, setting information about the galvano mirror 13, such as a scanning speed and the like, setting information about an optical path, which includes selections of a filter and a mirror, and setting information about an objective to be used, such as a magnification and a numerical aperture, and the like in addition to the above described setting information although these information items are not illustrated in FIG. 14.

When a user designates the optical characteristics of the sample by using the GUI component 45 and the GUI component 46, the control device 30 decides a recommended range of a pupil filling ratio based on information about the wavelength of the laser beam, the scattering characteristic of the sample S, and the size of the illuminant by referencing a recommended pupil filling ratio table provided in the storage device 60. Then, the control device 30 displays the recommended range of the pupil filling ratio on the slider of the GUI component 47.

For example, if the wavelength of the laser beam, the scattering characteristic of the sample S, and the size of the illuminant are 900 nm, "high", and "large" respectively, the recommended value of the pupil filling ratio, which satisfies these conditions, is within a range from 0.3 to 0.6 as illustrated in FIG. 10A. Accordingly, the two-photon excitation microscope apparatus 100 decides the recommended range of the pupil filling ratio as the range from 0.3 to 0.6. In FIG. 14, a shaded portion on the slider indicates the recommended range of the pupil filling ratio.

The user moves the slider of the GUI component 47 by using, as a reference, the recommended range of the pupil filling ratio displayed on the slider. Alternatively, the user may input a value in a textbox of the GUI component 47 instead of moving the slider. The control device 30 thereafter controls the beam diameter variable optics system 12 so that the pupil filling ratio becomes the rate designated by the user.

Other processes of the two-photon excitation microscope apparatus according to this embodiment are the same as those of the two-photon excitation microscope apparatus 100 according to the first embodiment.

As described above, with the two-photon excitation microscope apparatus according to this embodiment, a recommended range of a pupil filling ratio is decided based on optical characteristics of a sample. More specifically, the range of the pupil filling ratio is decided as a range including a smaller value as the scattering characteristic of the sample increases and the size of an illuminant grows. Then, the decided recommended range is displayed on the display device 40. Therefore, the user can designate a suitable pupil filling ratio while viewing the displayed recommended range as a reference. Accordingly, also with the two-photon excitation microscope apparatus according to this embodiment, an arbitrary sample can be brightly observed up to a deep portion with a simple operation similarly to the two-photon excitation microscope apparatus 100 according to the first embodiment.

Third Embodiment

Figure 15:
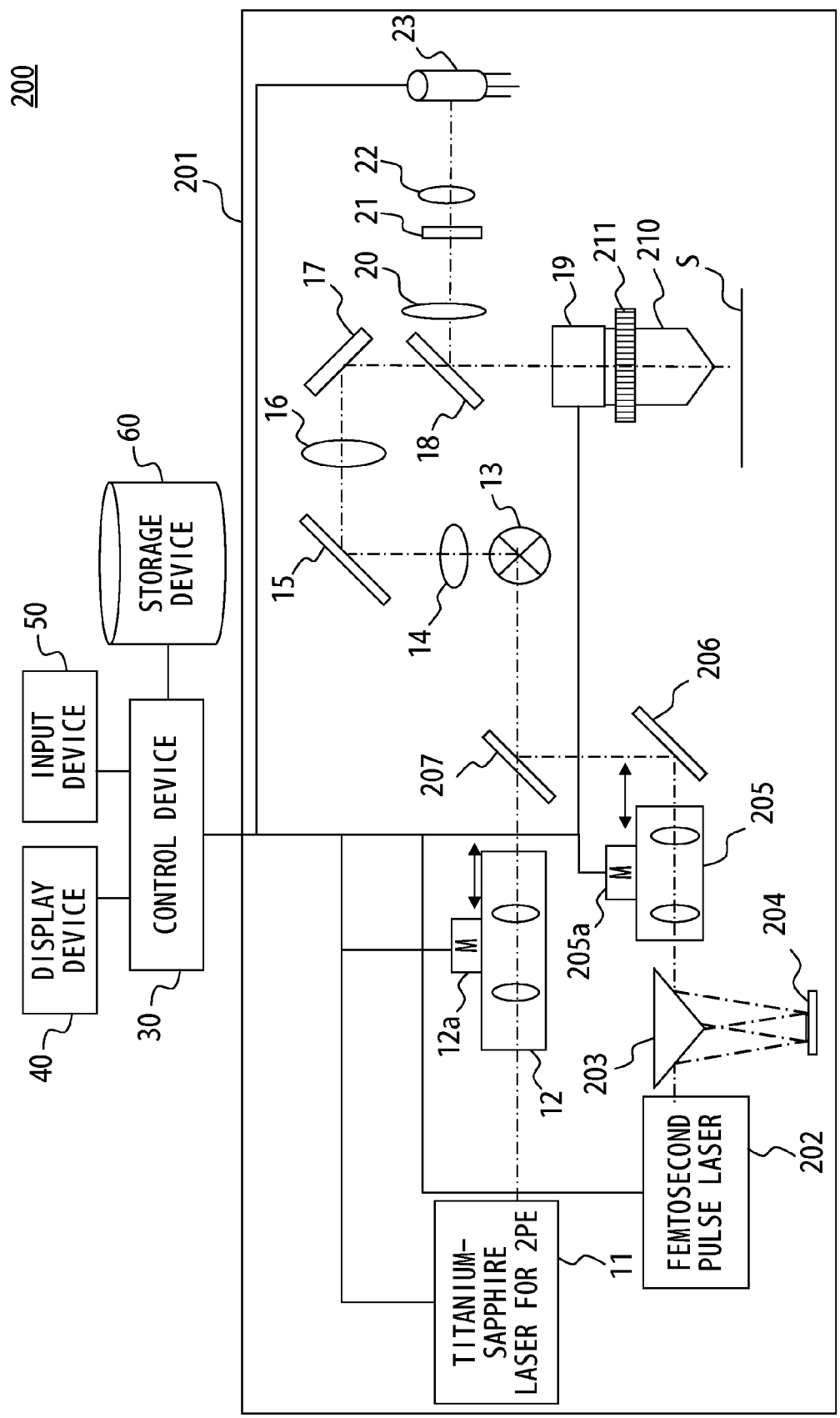
FIG. 15 illustrates a configuration of a two-photon excitation microscope apparatus according to a third embodiment of the present invention.

FIG. 15 illustrates a configuration of a two-photon excitation microscope apparatus 200 according to a third embodiment. The two-photon excitation microscope apparatus 200 obtains a satisfactory sample image by controlling a pupil filling ratio to a suitable value according to optical characteristics of the sample, more preferably, according to the optical characteristics of the sample and an observation depth. The two-photon excitation microscope apparatus 200 is different from the two-photon excitation microscope apparatus 100 according to the first embodiment illustrated in FIG. 6 in a point that a two-photon excitation microscope 201 is included as a replacement for the two-photon excitation microscope 10.

The two-photon excitation microscope 201 is different from the two-photon excitation microscope 10 in a point that the two-photon excitation microscope 201 includes second illumination means, and an objective 210 having a correction collar 211 as a replacement for the objective 1. Other points are the same as those of the two-photon excitation microscope 10.

The second illumination means includes a femtosecond pulse laser 202, a prism-type mirror 203, a reflective LCOS (trademark) (Liquid Crystal On Silicon) 204, a beam diameter variable optics system 205, and a mirror 206. A laser beam emitted from the second illumination means is guided by a dichroic mirror 207 to the same optical path as that of the laser beam emitted from the first illumination means (the titanium-sapphire laser 11, the beam diameter variable optics system 12).

The femtosecond pulse laser 202 is a laser for emitting a laser beam having a wavelength range different from that of the titanium-sapphire laser 11, and emits pulsed light having a pulse width on the order of femtoseconds. The femtosecond pulse laser 202 changes an intensity and a wavelength of the laser beam to be emitted under the control of the control device 30.

The prism-type mirror 203 is arranged to reflect the laser beam emitted from the femtosecond pulse laser 202 toward the reflective LCOS 204, and to reflect the laser beam emitted from the reflective LCOS 204 toward the mirror 206.

The reflective LCOS 204 is a spatial light modulator of a phase modulation type having a two-dimensional pixel structure, and arranged at a position conjugate with a pupil of an objective 210. The reflective LCOS 204 is configured to modulate a phase of a laser beam for each pixel according to a control signal from the control device 30.

The beam diameter variable optics system 205 is an optics system for varying a beam diameter in a way such that a lens that configures the beam diameter variable optics system 205 moves in an optical axis direction, and is a beam diameter change unit for changing the beam diameter of the laser beam incident to the objective 210. The beam diameter variable optics system 205 includes a driving unit 205a composed of a motor and the like. The driving unit moves the lens in the optical axis direction, so that the beam diameter of the laser beam is changed under the control of the control device 30.

The dichroic mirror 207 is optical path coupling means for coupling optical paths of the laser beam emitted from the titanium-sapphire laser 11 and that emitted from the femtosecond pulse laser 202. The dichroic mirror 207 has a characteristic of transmitting the laser beam emitted from the titanium-sapphire laser 11, and of reflecting the laser beam emitted from the femtosecond pulse laser 202.

The objective 210 is an objective including the correction collar 211 for correcting a spherical aberration caused by an index mismatch, fluctuations of an observation depth, or the like. The objective 210 is configured so that any of the lenses that configure the objectives 210 moves to the optical axis with a rotation of the correction collar 211.

In the two-photon excitation microscope apparatus 200 configured as described above, the control device 30 controls the beam diameter variable optics system 12 so that a ratio (hereinafter referred to as a first pupil filling ratio) of a beam diameter of the laser beam, which is emitted from the titanium-sapphire laser 11 and incident to the objective 210, to a pupil diameter of the objective 210 becomes a value decided based on a depth of an observation plane to be observed (namely, an observation depth) by using the first illumination means, and the optical characteristics of the sample S. Accordingly, with the two-photon excitation microscope apparatus 200, an arbitrary sample can be brightly observed up to a deep portion by using the first illumination means.

Additionally, in the two-photon excitation microscope apparatus 200, the control device 30 controls the beam diameter variable optics system 205 so that a ratio (hereinafter referred to as a second pupil filling ratio) of a beam diameter of the laser beam, which is emitted from the femtosecond pulse laser 202 and incident to the objective 210, to the pupil diameter of the objective 210 becomes a value decided based on the depth of the observation plane to be observed (namely, the observation depth) by using the second illumination means, and the optical characteristics of the sample S. Accordingly, with the two-photon excitation microscope apparatus 200, an arbitrary sample can be brightly observed up to a deep portion by using the second illumination means.

Furthermore, in the two-photon excitation microscope apparatus 200, the first pupil filling ratio and the second pupil filling ratio can be separately adjusted by controlling the beam diameter variable optics system 12 and the beam diameter variable optics system 205. Accordingly, portions of different depths of the sample S can be brightly observed at the same time by using the first illumination means and the second illumination means that respectively emit laser beams having different wavelengths. Moreover, also portions of the same depth of the sample S can be brightly observed at the same time by using different wavelengths.

Still further, the objective 210 of the two-photon excitation microscope apparatus 200 has the correction collar 211. Therefore, a spherical aberration caused by fluctuations of an observation depth can be corrected by operating or controlling the correction collar 211 according to the observation depth. Note that the correction of the spherical aberration, which is made by the correction collar 211, may be applied to both an observation using the first illumination means and that using the second illuminati means.

Still further, when the observation using the first illumination means and that using the second illumination means in the two-photon excitation microscope apparatus 200 are conducted at the same time, a spherical aberration caused in the observation using the first illumination means may be corrected with the correction collar 211, and a spherical aberration caused in the observation using the second illumination means may be corrected with the reflective LCOS 204. Since a technique for correcting a spherical aberration with a spatial light modulator of a phase modulation type arranged at a position conjugate with a pupil of an objective 210 is known, its detailed description is omitted.

The above described embodiments refer to the specific examples for ease of understanding of the present invention. The present invention, however, is not limited to these embodiments. The nonlinear optical microscope apparatuses can be diversely modified and changed in a scope that does not depart from the concept of the present invention stipulated by claims. For example, the first to the third embodiments refer to the two-photon excitation microscope apparatus as a nonlinear optical microscope apparatus. However, a three-photon excitation microscope, an SHG (Second Harmonic Generation) microscope, a THG (Third Harmonic Generation) microscope, a CARS (Coherent Anti-Stokes Raman Scattering) microscope, or the like may be implemented as the nonlinear optical microscope apparatus.

According to the present invention, optical characteristics of a sample, more preferably, an observation depth and the optical characteristics of the sample are taken into account to decide a pupil filling ratio. However, the present inventor found out that a pupil filling ratio smaller than a conventionally considered ratio is sometimes preferable when the observation depth and the optical characteristics of the sample are taken into account. Specifically, it is desirable to set the pupil filling ratio to a value equal to or higher than 0.3 and equal to or smaller than 1 according to the observation depth and the optical characteristics of the sample.

What is claimed is:

1. A nonlinear optical microscope apparatus, comprising:
    an objective for irradiating a laser beam on a sample;
    a beam diameter change unit for changing a beam diameter of the laser beam incident to the objective; and
    a control unit for deciding, for each of optical characteristics of the sample, a pupil filling ratio, which is a ratio of the beam diameter of the laser beam incident to the objective to a pupil diameter of the objective, based on the optical characteristics of the sample, and for controlling the beam diameter change unit so that the pupil filling ratio becomes the decided value,
    wherein:
    the control unit decides, for each of the optical characteristics of the sample, based on an observation depth which is a depth of an observation plane, the pupil filling ratio to be smaller as the observation depth increases, and controls the beam diameter change unit so that the pupil filling ratio becomes the decided value, the optical characteristics of the sample include at least one of a scattering characteristic of the sample and a size of an illuminant within the sample, and the control unit decides the pupil filling ratio to be smaller as the scattering characteristic of the sample increases and the size of the illuminant within the sample grows, when the observation depth is the same.

2. The nonlinear optical microscope apparatus according to claim 1, wherein the control unit decides the pupil filling ratio to be smaller as a wavelength of the laser beam decreases for each combination of an observation depth and an optical characteristic of the sample based on the observation depth, the optical characteristic of the sample, and the wavelength of the laser beam, and controls the beam diameter change unit so that the pupil filling ratio becomes the decided value.

3. The nonlinear optical microscope apparatus according to claim 2, further comprising:

a storage unit for making an association among the optical characteristic of the sample, the observation depth, the wavelength of the laser beam and the pupil filling ratio, and for storing the optical characteristic of the sample, the observation depth, the wavelength of the laser beam, and the pupil filling ratio, wherein the control unit controls the beam diameter change unit by referencing the storage unit.

4. The nonlinear optical microscope apparatus according to claim 3, further comprising a photodetector for detecting nonlinear response light, wherein the control unit obtains, for each pupil filling ratio, an image of the sample based on a signal from the photodetector by controlling the beam diameter change unit and the photodetector, decides one image having the highest evaluation by comparing a plurality of images of the sample, which are obtained for respective pupil filling ratios based on a specified index, and causes the storage unit to store the pupil filling ratio, which is used when the decided one image is obtained, in association with the optical characteristic of the sample, the observation depth, and the wavelength of the laser beam, which are used when the decided one image is obtained.

5. The nonlinear optical microscope apparatus according to claim 4, wherein the specified index is brightness of an image.

6. The nonlinear optical microscope apparatus according to claim 3, further comprising:

a photodetector for detecting nonlinear response light;
a display unit for displaying an image of the sample; and
an input unit with which a user inputs information,
wherein the control unit obtains, for each pupil filling ratio, an image of the sample based on a signal from the photodetector by controlling the beam diameter change unit and the photodetector, causes the display unit to display a plurality of images of the sample for respective pupil filling ratios, decides one image from among the plurality of images of the sample according to information that is input from the input unit and related to the image selected by a user, and causes the storage unit to store the pupil filling ratio, which is used when the decided one image is obtained, in association with the optical characteristic of the sample, the observation depth, and the wavelength of the laser beam, which are used when the decided one image is obtained.

7. The nonlinear optical microscope apparatus according to claim 3, further comprising a spherical aberration correction unit for correcting a spherical aberration caused by fluctuations of the observation depth, wherein the storage unit stores a setting of the spherical aberration correction unit in association with the observation depth.

8. The nonlinear optical microscope apparatus according to claim 1, wherein the beam diameter of the laser beam incident to the objective is a light flux diameter of a portion having an intensity equal to or higher than $e^{-2}$ times of a peak intensity of the laser beam having a Gaussian intensity distribution.

9. The nonlinear optical microscope apparatus according to claim 1, wherein the control unit controls the beam diameter change unit so that the pupil filling ratio becomes a value equal to or larger than 0.3 and equal to or smaller than 1.

10. A nonlinear optical microscope apparatus, comprising:

an objective for irradiating a laser beam on a sample;
a beam diameter change unit for changing a beam diameter of the laser beam incident to the objective; and
a control unit for deciding, for each of optical characteristics of the sample, a pupil filling ratio, which is a ratio of the beam diameter of the laser beam incident to the objective to a pupil diameter of the objective, based on the optical characteristics of the sample, and for controlling the beam diameter change unit so that the pupil filling ratio becomes the decided value, wherein:

the control unit decides, for each of the optical characteristics of the sample, based on an observation depth which is a depth of an observation plane, the pupil filling ratio to be smaller as the observation depth increases, and controls the beam diameter change unit so that the pupil filling ratio becomes the decided value, the optical characteristics of the sample include at least one of a scattering characteristic of the sample, a size of an illuminant within the sample, and uniformity of a refractive index of the sample, and the control unit decides the pupil filling ratio to be smaller as the scattering characteristic of the sample increases, the size of the illuminant within the sample grows, and the uniformity of the refractive index of the sample decreases, when the observation depth is the same.

11. A nonlinear optical microscope apparatus, comprising:
an objective for irradiating a laser beam on a sample;
a storage device provided with a recommended pupil filling ratio table that stores a recommended value of a pupil filling ratio, which is a ratio of a beam diameter of the laser beam incident to the objective to a pupil diameter of the objective, the recommended value being associated with an observation depth and optical characteristics of the sample;
a beam diameter change unit for changing the beam diameter of the laser beam incident to the objective;
a control unit for deciding a recommended range of the pupil filing ratio based on the optical characteristics of the sample and the recommended pupil filling ratio table;
a display unit for displaying the recommended range decided by the control unit; and
an input unit with which a user designates a pupil filling ratio to be set,
wherein the control unit controls the beam diameter change unit so that the pupil filling ratio becomes the pupil filling ratio designated by the user.

12. A nonlinear optical microscope apparatus, comprising:
- an objective for irradiating a laser beam on a sample;
- a storage device provided with a recommended pupil filling ratio table that stores a recommended value of a pupil filling ratio, which is a ratio of a beam diameter of the laser beam incident to the objective to a pupil diameter of the objective, the recommended value being associated with an observation depth and optical characteristics of the sample;
- a beam diameter change unit for changing a beam diameter of the laser beam incident to the objective; and
- a control unit for deciding the pupil filling ratio for each of the optical characteristics of the sample based on the optical characteristics of the sample and the recommended pupil filling ratio table, and for controlling the beam diameter change unit so that the pupil filling ratio becomes the decided value,
- wherein the control unit decides, for each of the optical characteristics of the sample, based on the observation depth, the pupil filling ratio to be smaller as the observation depth increases, and controls the beam diameter change unit so that the pupil filling ratio becomes the decided value.

* * * * *